June 19, 1945.  R. F. THORNTON  2,378,810
VEHICLE CONSTRUCTION
Filed Dec. 28, 1942  4 Sheets-Sheet 1

INVENTOR
Ray F. Thornton.
BY Harness, Dickey & Pierce
ATTORNEYS.

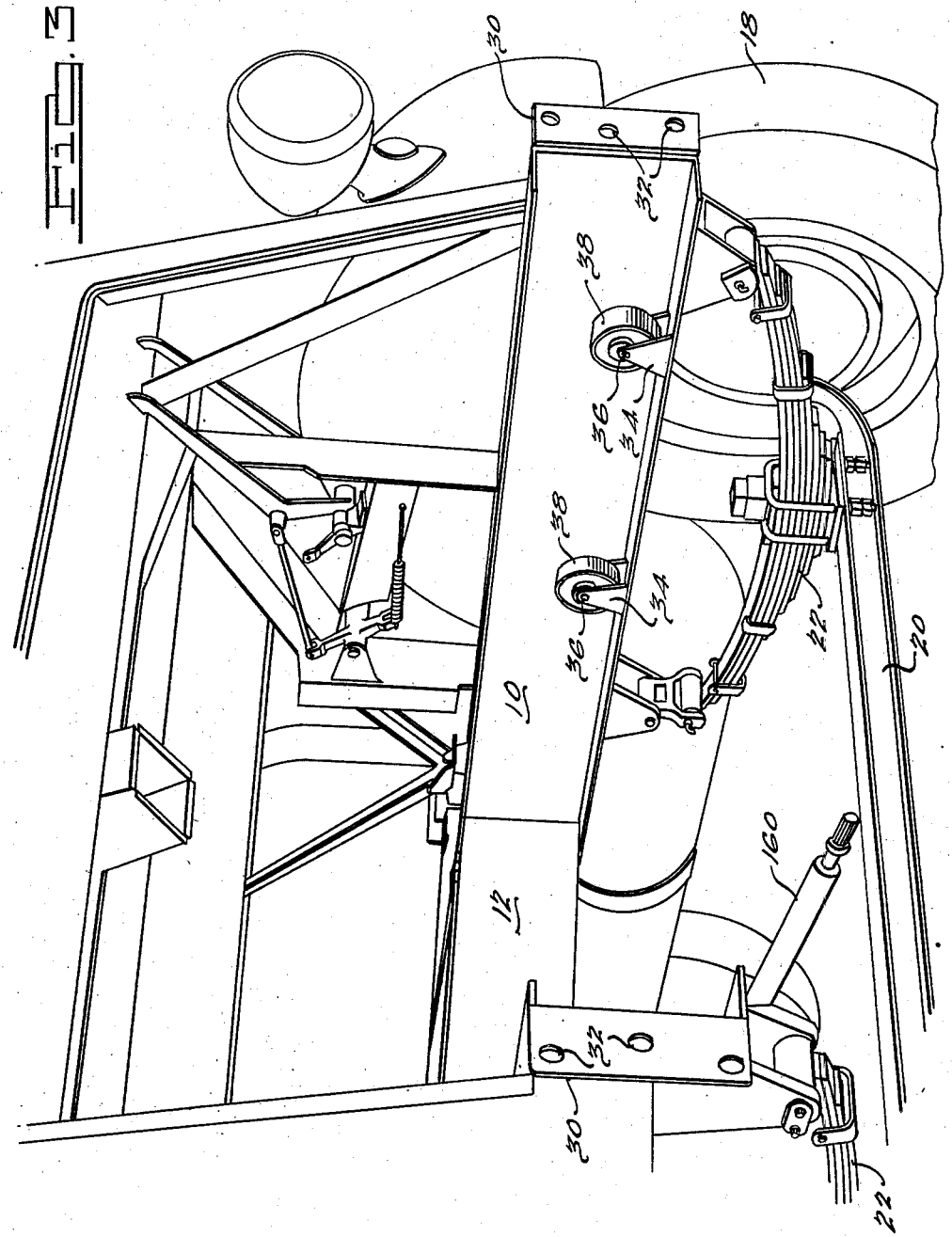

June 19, 1945.  R. F. THORNTON  2,378,810
VEHICLE CONSTRUCTION
Filed Dec. 28, 1942  4 Sheets-Sheet 3
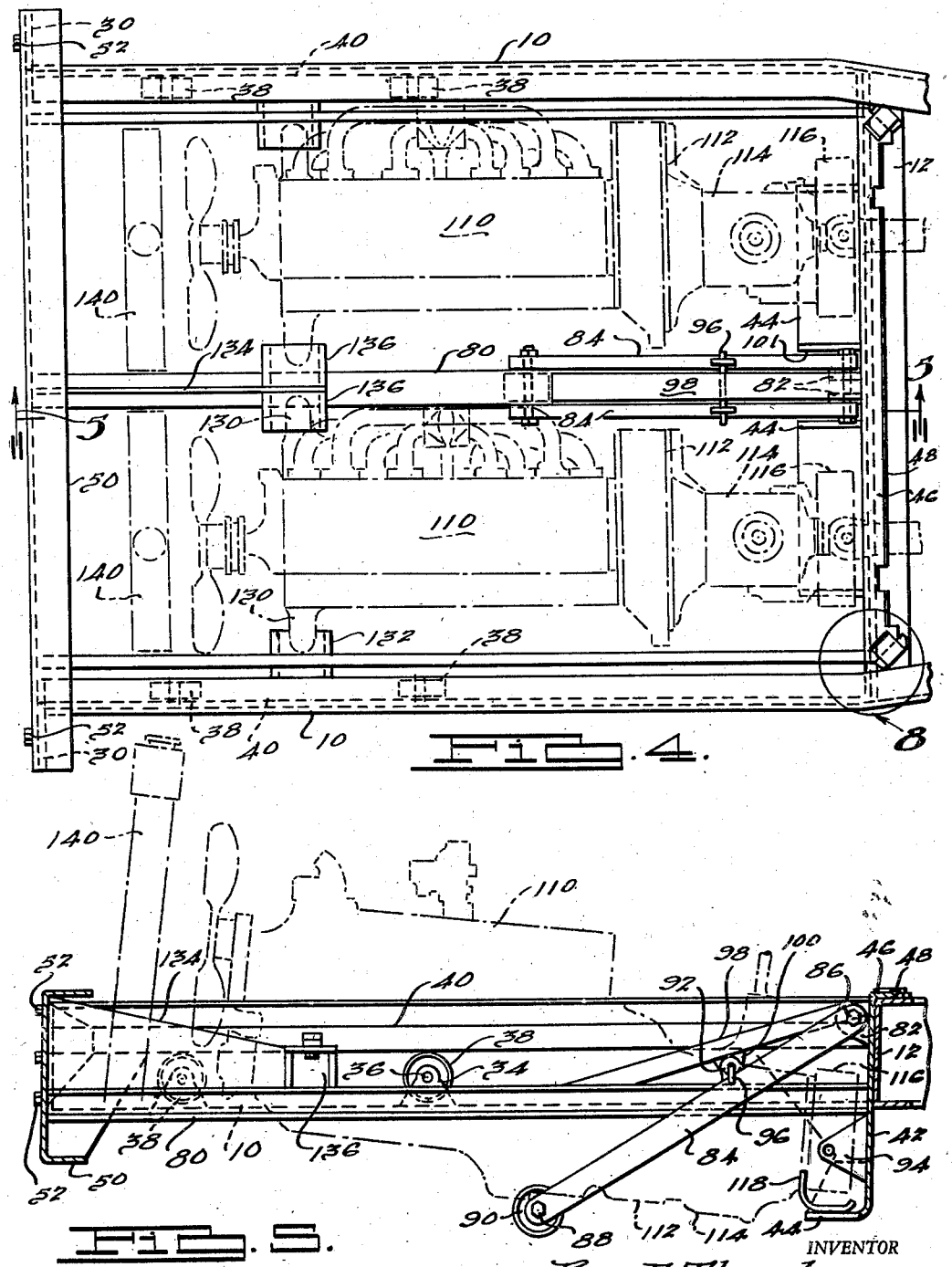
INVENTOR
Ray F. Thornton.
BY Harness, Dickey & Pierce
ATTORNEYS.

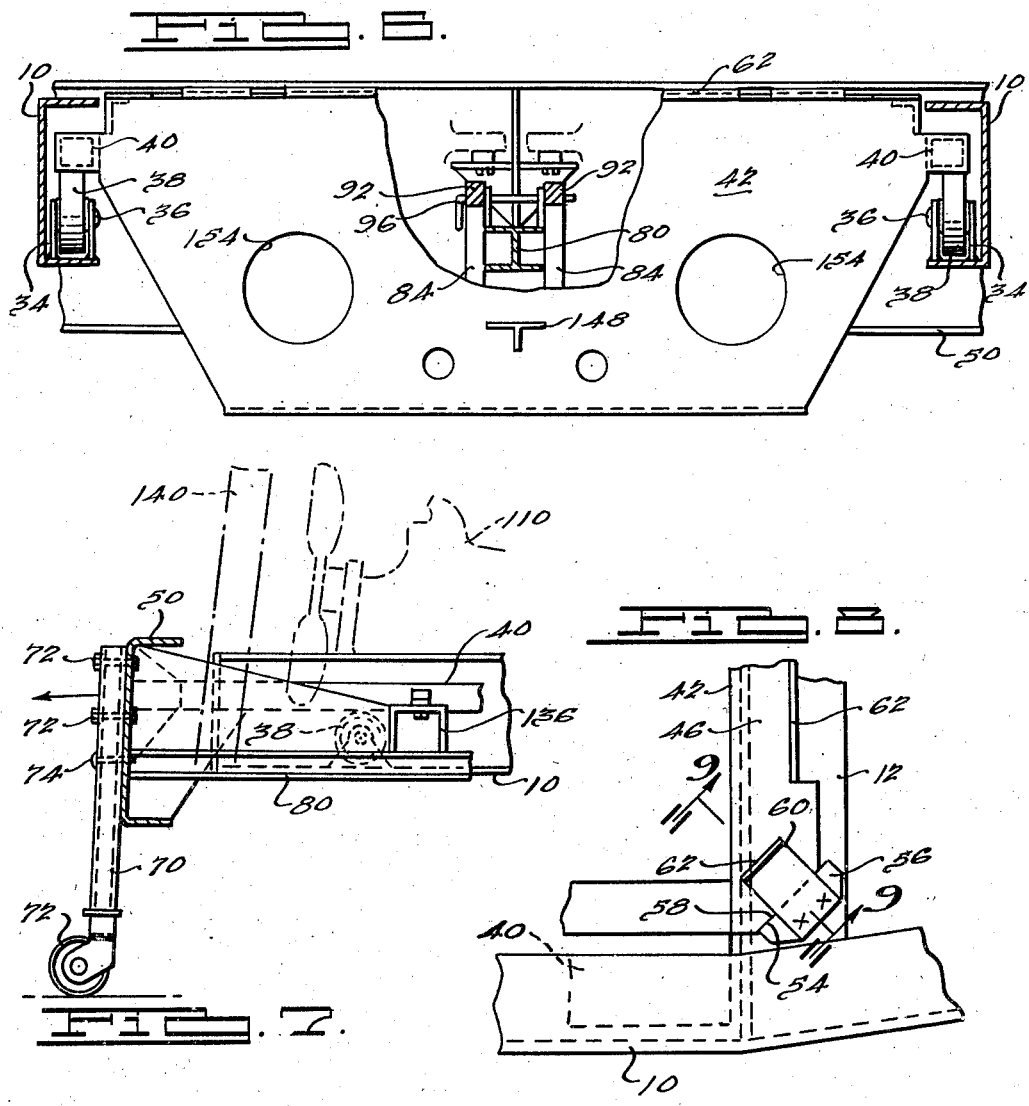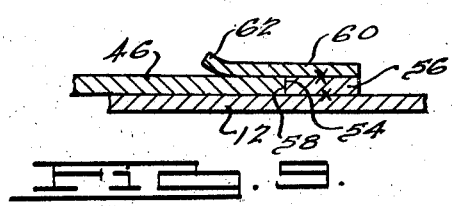

Patented June 19, 1945

2,378,810

UNITED STATES PATENT OFFICE 2,378,810

VEHICLE CONSTRUCTION

Ray F. Thornton, Dearborn, Mich.

Application December 28, 1942, Serial No. 470,349

10 Claims. (Cl. 180—64)

This invention relates to motor vehicles and particularly to those types thereof in which the engine or engines and certain parts associated therewith, such as cooling radiators, are mounted upon a sub-frame so as to form a unit which is applicable and removable as such to and from the vehicle, the principal object being the provision of a construction of the type described that is relatively simple in construction, efficient in operation, and in which a minimum amount of labor is involved in applying or removing such unit to or from the vehicle.

Objects of the invention include the provision of a motor vehicle in which the power plant is mounted upon an auxiliary frame structure which is slidably associated with the frame of the vehicle, the auxiliary frame being provided with a cross-member common to both itself and to the main frame of the vehicle; the provision of a construction as above described in which the cross-member is permanently attached to the auxiliary frame; the provision of a construction as above described in which the auxiliary frame is mounted on rollers carried by the main frame for sliding movement into and out of operative relation with respect to the main frame; the provision of a construction as above described in which the relation of the rollers and the auxiliary frame is such that the side members of the auxiliary frame protect the surfaces thereof which contact the rollers during such sliding movement from accumulations of mud or the like; the provision of a vehicle having a main frame and an auxiliary power plant carrying frame slidably associated therewith in which the auxiliary frame is centered with respect to the main frame and in which the auxiliary frame is secured in place in a novel and simple manner; the provision of a construction as above described in which the auxiliary frame and the main frame cooperate with one another to lock the inner end of the auxiliary frame securely in place and against movement in any direction, the only securing means between the auxiliary frame and the main frame required to be manually released to remove the auxiliary frame being at the outer end of the latter; and the provision of a novel leg structure in a construction of the type described associated with the auxiliary frame and serving to support it in spaced relation to the ground when removed from the main frame.

Other objects of the invention include the provision of a vehicle having a main frame and an auxiliary frame slidably associated and removable therefrom and forming with the power plant of the engine a unit, the unit comprising a pair of internal combustion engines mounted in the auxiliary frame in a novel manner; the provision of an auxiliary frame of the type above described of new and novel construction; the provision of an auxiliary member as above described including side members and a central member, the central member providing a support for the opposed sides of a pair of internal combustion engines carried by the auxiliary frame and as a stiffening means for the auxiliary frame itself; and the provision of an auxiliary frame structure as above described having a supporting leg associated therewith in a new and novel manner.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a side elevational view of a truck-tractor embodying a removable engine unit in accordance with the present invention;

Fig. 3 is an enlarged, fragmentary, perspective view showing the front end of the truck-tractor illustrated in Fig. 1 after the power plant unit shown in Fig. 2 has been removed therefrom;

Fig. 4 is a fragmentary plan view of the forward end of the main frame of the truck-tractor shown in Fig. 1 with the auxiliary power plant supporting frame in operative relation with respect thereto;

Fig. 5 is a vertical sectional view of that portion of the structure shown in Fig. 4 and taken as on the line 5—5 thereof;

Fig. 6 is a partially broken, partially sectioned view of the structure shown in Figs. 4 and 5 taken from the rear end thereof;

Fig. 7 is a fragmentary, vertical sectional view taken in a plane parallel with the longitudinal axis of the vehicle shown in the preceding views at the forward end thereof illustrating the manner in which the forward supporting legs are secured to the auxiliary frame when it is desired to remove it from the vehicle;

Fig. 8 is an enlarged, fragmentary plan view illustrating in greater detail the form of the connection between the inner end of the auxiliary frame and the main frame for centering the auxiliary frame with respect to the main frame and maintaining it against relative vertical movement; and, Fig. 9 is an enlarged, fragmentary vertical sectional view taken on the line 9—9 of Fig. 8.

Figures 1, 2:
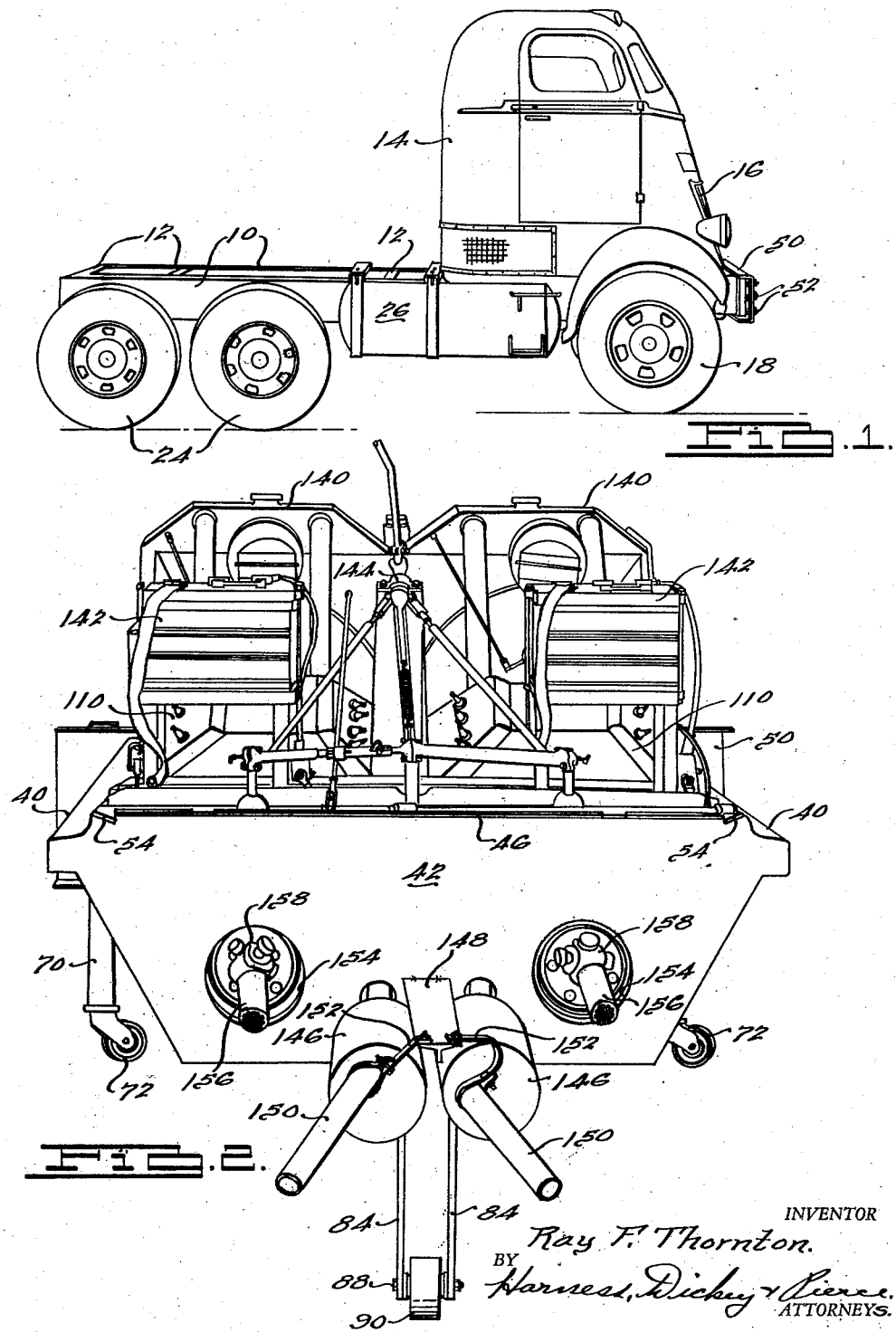
Fig. 2 is an enlarged, perspective rear view of the power plant unit as it appears when removed from the vehicle illustrated in Fig. 1.

The present invention relates to that type of motor vehicle structure in which the engine or engines employed for driving the vehicle, the radiator where employed, and certain other auxiliary parts of the vehicle are formed into a unit which is applicable to and removable from the vehicle as such in order to simplify particularly the servicing of such engine and parts. Obviously, it is applicable for use in such vehicles whether the engine is mounted at the front of the vehicle or at the rear thereof, the former type of construction being shown by way of illustration. In its broader sense the invention is equally applicable to use in such vehicles whether the vehicle is equipped with one engine or with two engines but inasmuch as a more limited phase of the present invention deals with the construction of such units where two engines are employed, a vehicle equipped with two such engines is shown in the drawings by way of illustration. It will also be appreciated that the invention is applicable to motor vehicles regardless of the type and/or intended use, it being shown as applied to a vehicle of the truck-tractor type in the accompanying drawings for the purpose of simplicity in showing only.

Referring now to the accompanying drawings and particularly to Fig. 1 the vehicle there shown, as above described, is of the so-called truck-tractor type including a relatively short frame having side members 10 and a plurality of cross-members 12 rigidly and permanently fixed thereto, the forward of such permanent cross-members 12 being spaced a material distance rearwardly of the forward end of the frame side members 10 as particularly brought out in Fig. 3. As in the case of many of such so-called truck-tractors the cab 14 which is positioned at the front end of the frame is of the so-called "over the engine" type and in the particular case shown it is provided with a front grille 16 which is conveniently removable when it is desired to remove or replace the power plant. At its forward end the frame is supported by a pair of steering wheels indicated generally at 18 which, as best brought out in Fig. 3, are carried at the opposite ends of a conventional front axle 20 connected to the frame side members 10 by means of conventional semi-elliptic leaf springs 22. In the particular vehicle shown and as indicated in Fig. 1 tandem axles (not seen) support the rear end of the vehicle and are provided with wheels indicated generally at 24. A fuel tank such as 26 may be conveniently mounted on a side of the frame of the vehicle as shown.

As perhaps best brought out in Fig. 3 the frame side members 10 are of conventional channel section and relatively deep with the channels of the opposite members facing each other in accordance with conventional practice and arranged in parallel relation particularly over the forward portions thereof. As previously mentioned and as indicated in Fig. 3 no permanent cross-members interconnect the side members 10 over the forward portion of the frame where the power plant is received and the forward end of each frame side member 10 is provided with a laterally outwardly directed flange 30 rigidly fixed thereto each of which is provided with a plurality of bolt receiving holes 32 therethrough. As also best brought out in Fig. 3 the lower flange of each frame side member within the length thereof which receives the power plant unit has secured thereto two or more pairs of upwardly extending bifurcated brackets 34 in spaced relation with respect to each other longitudinally of the corresponding frame side member 10 and each bracket 34 is provided with a pin 36 extending between the opposite legs thereof adjacent the upper end thereof and on each pin 36 is rotatably mounted a roller 38, preferably through the use of anti-friction bearings. The auxiliary frame forming a part of the power plant unit is adapted to ride on the rollers 38 as will hereinafter be more specifically brought out.

As best brought out in Figs. 4, 5, and 6 the auxiliary power plant includes a pair of parallel and preferably rectangularly sectioned and preferably tubular side members 40 of a length substantially equal to the distance between the front permanent cross-member 12 and the forward ends of the frame side members 10. The side members 40 lie partially housed within the corresponding main frame side members 10 and are permanently connected across their rear ends by a relatively deep cross-member 42 having a forwardly directed flange 44 at the lower end and a rearwardly directed flange 46 at its upper end, the extreme rear edge portion of the latter being upwardly curved as at 48 as best brought out in Fig. 5. This cross-member 42 is cut away at its opposite ends as best brought out in Fig. 6 to permit its passage between the main frame side rails 10. As best brought out in Fig. 5, the position of the cross-member 42 is such that when the auxiliary frame is in assembled relation with respect to the main frame the flange 46 overlies and rests upon the upper flange of the foremost permanent cross-member 12 and thereby serves as a means for supporting the weight of the rear end of the auxiliary frame and parts carried thereby on the main frame.

The side members 40 are permanently connected at their front end by means of a relatively deep rearwardly opening channel sectioned member 50 the upper and lower flanges of which extend over and under, respectively, the upper and lower flanges of the frame side members 10, and the web of such cross-member 50, when the auxiliary frame is assembled to the main frame, is arranged in flat contacting relationship against the forward faces of the flanges 30. Bolts 52 project through openings in the cross-member 50 aligned with the holes 32 of the flanges 30 and through the holes 32 not only for the purpose of properly aligning the front end of the auxiliary frame with respect to the front end of the main frame but also for supporting the front end of the auxiliary frame on the front end of the main frame in proper relation with respect thereto. It will be appreciated that by removing the bolts 52 the auxiliary frame may be pulled out endwise from between the front ends of the frame side members 10 of the main frame and that likewise the auxiliary frame may be applied in the same manner, the bolts 52 thus serving as the only means for locking the auxiliary frame against retraction from the main frame. It will also be appreciated that the rollers 38 are so positioned that the underfaces of the auxiliary frame side members 40 ride upon them when the auxiliary frame is being removed from or applied to the main frame, the rollers 38 preferably being arranged at such height as to support the auxiliary frame during its passage thereover at substantially or very slightly below its final assembled position in the main frame. In other words, the rollers 38 may or may not serve to aid in supporting the auxiliary frame in the main frame in the final assembled position of the former, depending upon the vertical position of the rollers.

The bolts 52, of course, locate the front end of the auxiliary frame laterally with respect to the main frame side members 10. In order to locate the rear end of the auxiliary frame accurately with respect to the main frame and without necessitating the use of manually removable means such as bolts or the like, the following construction is resorted to. As best brought out in Figs. 4 and 8 and particularly the latter figure the outer rear corners of the upper flange 46 of the rear cross-member 42 of the auxiliary frame are cut off at an angle as indicated at 54 in Fig. 8, preferably at an angle of 45 degrees with respect to both the length and the width of the auxiliary frame. A plate 56 of substantially the same or slightly greater thickness than the thickness of the flange 46 is welded to the upper flange of the cooperating permanent cross-member 12 with an edge 58 thereof in contacting relationship with respect to the edge 54 at the corresponding end of the flange 46 and when the auxiliary frame is in its final position of assembly on the main frame. The two plates 56 thus provide a more or less wedge-like socket which, when the auxiliary frame is moved back into the main frame, serves to engage the angular faces 54 at the rear end of the auxiliary frame and through them guide the rear end of the auxiliary frame centrally into position with respect to the main frame and thereafter maintain the auxiliary frame against lateral movement at its rear end with respect to the main frame during such time that the auxiliary frame is secured in position on the main frame.

In order to prevent vertical displacement between the edges 54 of the flange 46 and the edges 58 of the plate members 56, a second plate member 60 is welded to the upper face of each plate member 56, as best brought out in Figs. 8 and 9, and the forward edge of the plate 60 is preferably upwardly turned as at 62. The plate 60 projects forwardly beyond the edge 58 of the corresponding plate 56 so as to overlie the upper surface of the flange 46 when the auxiliary frame is assembled to the main frame. It might be noted as brought out in Figs. 8 and 9 that the outer end portions of the flange 46 are not upturned, as at 48 over the central portion thereof, this, of course, being necessary so as to permit such end portions to be received below the corresponding plate members 60 as above described.

It will be understood, of course, that when the surfaces 54 and 58 above described are in engagement with each other on both sides of the vehicle, the front cross-member 50 of the auxiliary frame will lie in contact with the flanges 30 of the main frame side members 10 and the bolts 52 will serve to releasably secure the main and auxiliary frames rigidly together.

It is common practice in removable power plant units of this general type to provide supporting legs to support the unit at substantially the same distance above the floor or ground, when removed from the main frame, as when supported by the main frame. It has heretofore been suggested that the front supporting legs for the auxiliary frame be permanently pivotally connected thereto but I have found that this is undesirable for the reason that in such case it is necessary to withdraw the auxiliary frame partially, but to a material distance, from the main frame before it is possible to lower the front legs, this being for the reason that the front axle interferes with such lowering action of the front legs before the auxiliary frame is thus partially withdrawn. In such prior constructions it has happened that when a truck is headed down a slight incline when the auxiliary frame is being removed, as soon as the auxiliary frame has been disconnected from the main frame for sliding movement relative thereto the auxiliary frame with the power plant thereon has slipped forwardly under the force of gravity and before an opportunity has been offered to lower the front legs has slid out of the main frame onto the floor with, of course, resulting damage to the power plant and other parts of the unit. In accordance with the present invention the front supporting legs are not pivotally connected to the auxiliary frame but are separate therefrom and are readily attachable to and releasable therefrom and are so constructed and arranged that they may be secured in place before any appreciable movement of the auxiliary frame from out of the main frame has occurred.

Two of such supporting front legs are provided in the present case, and as best brought out in Fig. 7, each consists of a post 70 carrying a caster wheel 72 at its lower end. The upper end of each post 70 is adapted to lie in flat contacting relation with respect to the forward face of the cross-member 50 at the corresponding end thereof and to be secured to such front cross-member by one or more bolts 72 passing through the same openings therein as receive the bolts 52 previously described and employed to secure the front cross-member 50 to the flanged end 30. As a matter of fact it is only necessary to use one bolt such as 72 in each leg as dowel pins such as 74 permanently fixed in each leg and having a projecting end adapted to project through a hole in the front cross-member 50 provided for receiving one of the bolts 52 may suffice for taking both part of the vertical load on the leg and preventing relative lateral shifting movement of the leg with respect to the front cross-member in such case. The legs 70 may, of course, be carried or stored separately, and when it is desired to remove the auxiliary frame the bolts 52 may be removed, the auxiliary frame pulled out from the main frame sufficiently to insert nuts back of the cross-member 50 for the bolts 72, and the legs 70 then immediately applied, all of this work being accomplished at the front end of the auxiliary unit where a workman is in position to prevent the auxiliary frame from sliding under the force of gravity out from the front end of the main frame, thus eliminating the possibility of those occurrences which arise in connection with previously suggested constructions and as above described.

At the rear end of the auxiliary frame a single supporting leg is provided and this is of a permanently pivoted type and is mounted as follows. As best brought out in Figs. 4, 5, and 6, an I-beam, or an H-beam laid on its side, is provided centrally between the auxiliary frame side members 40 and extends from the rear cross-member 42 to the forward cross-member 50, it being relatively shallow in depth as compared with the depth of the main frame side members 10 and as perhaps best brought out in Fig. 7 and is arranged in parallelism with the lower flange of the main frame side members 10 with its lower edge slightly below the lower face of such main frame side member 10. A pair of laterally spaced ears 82 are suitably secured as by welding or the like to the forward face of the rear cross-member 42 adjacent the upper end thereof, as best brought out in Figs. 4 and 5, the outer faces of the ears 82 being spaced from each other by approximately the same or slightly greater distance than the width of the I-beam 80. A link 84 is pivotally mounted at one end against the outer face of each ear 82 by means of a pin 86, common to both links and to both ears, the links 84 extending downwardly on opposite sides of the member 80. At their lower ends the links 84 are connected together by means of a bolt or pin 88 which also serves as an axle or pivot pin for a roller 90. The links 84 and roller 90 thus provide the rear supporting leg which is mounted for pivotal movement about the axis of the pin 86, and the engagement of the links 84 with the I-beam 80 braces them against lateral movement under the weight of the unit when they are in lowered position.

Each link 84 is provided with an outstanding boss or ear 92 thereon which overlaps an ear 94 suitably fixed to the forward face of the cross-member 42 adjacent the lower end thereof when the leg is in its downward and supporting relation, the ears 92 and 94 having cooperating openings therein which may be aligned with each other and through which a removable rod or pin 96 may be projected to lock the leg in its supporting relation with respect to the auxiliary frame. A brace rod 98 is extended from the upper portion of the rear cross-member 42 substantially midway of the ears 82 thereon forwardly and downwardly and is suitably fixed to the I-beam 80, this being for the purpose of rendering the I-beam 80 more rigid under load. Intermediate its ends the rod 98 is provided with an ear 100, located at the same distance from the pin 86 as ears 92, so that when the leg, including the link 84, is swung in a clockwise direction from its lowered position and as viewed in Fig. 5, the ears 92 and 100 overlap each other and the pin 96 may be projected through the holes in the ears 92 and through an aligned hole in the ear 100 to lock such leg in its raised position. It will be appreciated that in withdrawing the auxiliary frame from the main frame it is necessary to withdraw it far enough out of the main frame to allow the rear leg 84 to clear the front axle 20 before it is possible to lower the rear leg and secure it in such position. It will also be appreciated that the lower flange 44 of the rear cross-member 42 is centrally cut out as at 101, seen in Fig. 4, to provide clearance for the leg including the links 84 when they are moved to their lowered position.

It will be appreciated from the foregoing description that the construction thus far described is applicable for use in a motor vehicle regardless of whether such motor vehicle is equipped with a single engine or dual engines, the former case possibly requiring a modification and/or elimination of the I-beam 80, depending upon the particular type and/or arrangement of such engine, and that the advantage of the construction will be realized in either case.

The employment of the I-beam 80 is of particular advantage where dual engines are employed and in this connection forms a more limited phase of the present invention. For this reason in the particular case shown dual engines indicated generally at 110 are mounted upon the auxiliary frame above described. It will be appreciated that these engines are of the conventional type employed in conventional pleasure automobiles, trucks or the like and include as a unit therewith the usual clutch contained within a housing such as 112, a transmission 114, and in the particular case shown a propeller shaft brake 116 all as best brought out in Figs. 4 and 5. In the particular case shown and as best brought out in Fig. 5 each power plant including an engine 110, clutch housing 112, transmission 114, and propeller shaft brake 116 is provided at its rear end with an angular flange or bracket 118, best shown in Fig. 5, which is rigidly fixed to the rear end of the transmission and extends below the corresponding propeller shaft brake 116 and this member 118 is utilized in the present case to support the rear end of each power plant by resting upon the upper face of the lower flange 44 of the rear cross-member 42 as shown in Fig. 5, where it may be maintained against relative movement with respect to the flange 44 in any suitable manner.

At their forward ends each engine 110 is provided at each side thereof with an outwardly projecting supporting leg 130 best shown in Fig. 4. Those legs 130 nearest the frame side members 40 for the auxiliary frame are supported upon U-sectioned brackets 132 which are welded or otherwise suitably secured to the corresponding frame side members 40. The supporting legs at the inner adjacent sides of the engines are supported in the following manner. As best brought out in Figs. 4 and 5 a plate member 134 arranged with the plane of its thickness vertical is positioned on the upper face of the I-beam 80 centrally thereof and is welded or otherwise suitably secured thereto and to the front cross-member 50. It extends rearwardly from the front cross-member 50 to a point slightly rearwardly of the supporting legs 130, and in line with such supporting legs 130 has suitably fixed to opposite sides thereof, as by welding or the like, supporting brackets 136 which receive and on which rest the corresponding motor supporting legs 130. The I-beam 80 thus not only serves as a means for rigidifying the auxiliary frame but also as a means for mounting the adjacent forward sides of the engines 110.

It will be appreciated, of course, that the auxiliary frame thus described not only supports the power plant including the engine 110 but other necessary auxiliaries for such engines and which auxiliary may include, for instance, a radiator 140 for each engine suitably connected thereto in a conventional manner, a battery such as 142 for each engine and other suitable or necessary devices. It is also preferable to mount the transmission control mechanism on the auxiliary frame and in Fig. 2 this is indicated generally at 144, the particular transmission control there shown comprising the subject matter of my United States Letters Patent No. 2,292,910, issued August 11, 1942, on Multiple gear shift, and reference to which may be made if more explicit information regarding the same is desired. Also as indicated in Fig. 2 a muffler 146 is preferably provided for each engine and mounted on the auxiliary frame as part of the unit and in such case, and as brought out in Fig. 2, a T-bar or the like 148 is preferably rigidly secured to the rear cross-member 42 by welding or the like and projects rearwardly therefrom, the tail pipes 150 for the mufflers being supported from the bar 148 by straps or brackets 152 thus to provide the proper support for the rear ends of the mufflers.

As also brought out in Fig. 2 the rear cross-member 42 is provided with an opening 154 therein through which the drive or propeller shaft for each engine may project so as to enable it to be connected to the driving axles of the associated vehicle. In the particular case shown the sleeves 156 on the rear end of the universal joints 158 provided at the rear end of each transmission 114 are illustrated as projecting through the corresponding openings 154. The sleeves 156 are releasably connected to the forward ends of the propeller shafts, one of which is seen at 160 in Fig. 3, and are simply disconnected from and pulled off of the forward ends of the propeller shafts when the power plant unit including the auxiliary frame described is removed from the main frame. In removing the power plant unit from the main frame it will be appreciated that it is not only necessary to disconnect the propeller shafts as above described but also to disconnect the wiring connecting the unit with the instrument panel positioned within the cab 14 and to disconnect the fuel feed line connecting the tank 26 with the engine, and such other parts as are interconnected between the unit and the cab 14 and which cannot be conveniently removed from the latter. However, it will be appreciated that the parts requiring to be disconnected are small in number as compared to the parts ordinarily required to be disconnected when removing an engine from the frame of a motor vehicle not equipped with such auxiliary frame and power plant unit and that, therefore, with the construction shown and described it is possible to remove one power plant unit from such a vehicle and replace it by a different one in but a fraction of the time which would be required to replace the power plant of a motor vehicle of conventional construction. The features above described constituting a part of the present invention materially aid in the speed of replacing one power plant by another in such cases.

Having thus described my invention what I claim by Letters Patent is:

1. In a motor vehicle, in combination, a main frame, an auxiliary frame slidable longitudinally of said main frame into and out of rigid engagement therewith, fixed wedge means formed on each side of the inner end of said auxiliary frame, fixed complementary wedge-like socket means integral with said main frame for interengaging relationship with respect to said wedge means, a cross member secured to the outer end of said auxiliary frame and having overlying end portions detachably connected with the corresponding end of said main frame for maintaining said wedge means in fixed operative aligned engagement in said wedge-like socket means, and a power plant mounted on said auxiliary frame and removable therewith as a unit from said frame.

2. In a motor vehicle, in combination, a main frame, an auxiliary frame, means mounting said auxiliary frame for sliding movement into and out of rigid engagement with said main frame, a wedge means disposed substantially in a horizontal plane adjacent the inner end and at each side of said auxiliary frame and fixed with respect thereto each wedge having a surface inclined relative to both the length and the width of said auxiliary frame, complemental socket members rigidly secured to said main frame to receive the inclined surfaces of said wedge means and a cross member secured to the opposite end of said auxiliary frame and having extending end portions overlying the ends of said main frame and means for releasably securing the ends of said cross member to the ends of said main frame to maintain the inclined surfaces of said wedge members in substantial engagement with said socket members.

3. In a motor vehicle, in combination, a main frame, an auxiliary frame, means mounting said auxiliary frame for sliding movement into and out of rigid locking engagement with said main frame, wedge members disposed substantially in a horizontal plane adjacent the inner end of each side of said auxiliary frame and fixed with respect thereto providing a pair of oppositely inclined surfaces inclined relative to both the length and the width of said auxiliary frame, socket members secured to opposite sides of said main frame and providing surfaces complementary to the said inclined surfaces of said wedge members, and releasable means at the opposite end of said auxiliary frame cooperating between said auxiliary frame and said main frame to releasably lock said frames in position and maintain said wedge surfaces in substantial engagement with said socket members.

4. In a motor vehicle, in combination, a main frame including a pair of side members, a cross-member permanently secured to and extending between said side members at a point thereon spaced longitudinally from one end of said side members, an auxiliary frame receivable between said side members, means cooperating between said side members and said auxiliary frame for supporting said auxiliary frame for slidable movement between said frame side members, said auxiliary frame including a cross-member at the inner end thereof, means on said auxiliary frame cross-member providing a pair of oppositely disposed surfaces lying approximately in a horizontal plane and disposed at an angle to both the length and the width of said auxiliary frame, stop means mounted on said cross-member of said main frame providing a pair of surfaces complementary to said surfaces on said cross-member of said auxiliary frame and arranged for cooperating engagement therewith when said auxiliary frame is at the inner limit of its slidable movement, and a cross member secured to the outer end of said auxiliary frame and having extending end portions overlying the outer ends of said main frame side members and releasable means cooperating between the overlying ends of said last named cross-member and said main frame for selectively securing said surfaces in locked engagement with each other.

5. In a motor vehicle, in combination, a pair of main frame side members, a cross-member permanently secured between said frame side members in inwardly spaced relationship with respect to one end of said side members and having a horizontally directed upper flange, an auxiliary frame receivable between said frame side members, means for slidably supporting said auxiliary frame between said frame side members for slidable movement longitudinally thereof, said auxiliary frame including an inner cross-member, an upper flange on said cross-member of said auxiliary frame directed horizontally inwardly with respect to the corresponding end of said main frame and arranged in overlying relationship with respect to said flange of said cross-member of said main frame when said auxiliary frame is at the inner limit of its slidable position in said main frame, and a cross member secured to the outer end of said auxiliary frame and adapted for connection with said main frame side members at the outer ends thereof to connect the outer ends of said main frame side members and support said end of said auxiliary frame on said main frame, and detachable means for securing said auxiliary frame in locked engagement with said main frame.

6. In a motor vehicle, in combination, a pair of main frame side members, a cross-member permanently secured between said frame side members in inwardly spaced relationship with respect to one end of said side members and having a horizontally directed upper flange, an auxiliary frame receivable between said frame side members, means for slidably supporting said auxiliary frame between said frame side members for slidable movement longitudinally thereof, said auxiliary frame including an inner cross-member, an upper flange on said cross-member of said auxiliary frame directed horizontally inwardly with respect to the corresponding end of said main frame and arranged in overlying relationship with respect to said flange of said cross-member of said main frame when said auxiliary frame is at the inner limit of its slidable position in said main frame, the opposite ends of said flange of said cross-member of said auxiliary frame being formed to provide a pair of surfaces disposed at an angle to both the length and width of said auxiliary frame and inclined in opposite directions with respect to each other, means overlying the upper face of said cross-member of said main frame providing surfaces complementary to the first-mentioned surfaces and in interengaging relationship with respect thereto when said auxiliary frame is at the inner limit of its slidable position in said main frame, and additional means overlying said flange on said rear cross-member of said auxiliary frame when said auxiliary frame is in the last-mentioned position serving to maintain said flanges in contacting relationship with respect to each other.

7. In a motor vehicle, in combination, a main frame, an auxiliary frame, means mounting said auxiliary frame for sliding movement into and out of rigid operative engagement with said main frame, wedge means disposed substantially in a horizontal plane adjacent each longitudinal edge at the inner end of said auxiliary frame and fixed with respect thereto and providing a pair of oppositely inclined surfaces inclined relative to both the length and the width of said auxiliary frame, wedge receiving socket means fixed on each longitudinal edge of said main frame and providing surfaces complementary to the surfaces of said wedge means, an outwardly directed flange fixed to the outer end of each of said main frame side members, an outer cross-member fixed to the outer end of said auxiliary frame, and having extending end portions overlying said flanges, and screw means for detachably connecting said flanges and said outer cross-member to maintain said wedge surfaces in engagement in said socket members.

8. In a motor vehicle, in combination, a pair of main frame side members, a cross-member permanently secured between said frame side members in inwardly spaced relationship with respect to one end of said side members and having a horizontally directed upper flange, an auxiliary frame receivable between said frame side members, means for slidably supporting said auxiliary frame between said frame side members for slidable movement longitudinally thereof, said auxiliary frame including an inner cross-member, an upper flange on said cross-member of said auxiliary frame directed horizontally inwardly with respect to the corresponding end of said main frame and arranged in overlying relationship with respect to said flange of said cross-member of said main frame when said auxiliary frame is at the inner limit of its slidable position in said main frame, the opposite ends of said flange of said cross-member of said auxiliary frame being formed to provide a pair of surfaces disposed at an angle to both the length and width of said auxiliary frame and inclined in opposite directions with respect to each other, means overlying the upper face of said cross-member of said main frame providing surfaces complementary to the first-mentioned surfaces and in interengaging relationship with respect thereto when said auxiliary frame is at the inner limit of its slidable position in said main frame, additional means overlying said flange on said rear cross-member of said auxiliary frame when said auxiliary frame is in the last-mentioned position serving to maintain said flanges in contacting relationship with respect to each other, an outwardly directed flange fixed to the outer end of each of said main frame side members, an outer cross-member fixed to the outer end of said auxiliary frame, said outer cross-member overlying said flanges, and screw means cooperating between said flanges and said outer cross-member serving to releasably maintain said surfaces in contacting relation with respect to each other.

9. An auxiliary frame for a removable power plant unit for a motor vehicle comprising, in combination, a pair of frame side members, cross-members rigidly interconnecting said frame side members at opposite ends thereof, a third frame member interconnecting said cross-members and located centrally between said frame side members, a pair of parallel leg members pivotally mounted at one end to one of said cross-members, said leg members extending downwardly on opposite sides of said third frame member, a roller rotatably mounted between the free ends of said leg members below said third member, and means for releasably locking said leg members at either limit of their pivotal position.

10. An auxiliary frame for a removable power plant unit for a motor vehicle comprising, in combination, a pair of frame side members, cross-members rigidly interconnecting said frame side members at opposite ends thereof, a third frame member interconnecting said cross-members and located centrally between said frame side members, a longitudinally extending upwardly projecting plate member fixed to said third frame member, motor supporting legs pivotally mounted on said plate member and motor leg supporting brackets carried by one of said cross-members adjacent said plate member.

RAY F. THORNTON.